United States Patent
Baba et al.

(10) Patent No.: US 7,873,470 B2
(45) Date of Patent: Jan. 18, 2011

(54) MAP MOVING APPARATUS

(75) Inventors: Akihisa Baba, Iwaki (JP); Mitsuru Kawahata, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 728 days.

(21) Appl. No.: 11/545,811

(22) Filed: Oct. 10, 2006

(65) Prior Publication Data
US 2007/0083325 A1  Apr. 12, 2007

(30) Foreign Application Priority Data
Oct. 11, 2005  (JP)  ............ 2005-297043

(51) Int. Cl.
*G01C 21/30* (2006.01)
*G08G 1/123* (2006.01)

(52) U.S. Cl. ............ 701/209; 340/995.19; 340/995.1; 340/995.11

(58) Field of Classification Search ............ 701/208, 701/200–202, 206, 207, 205, 211–213, 216; 340/995.14, 988, 995, 991, 990, 995.15, 340/995.19, 995.1, 995.27, 995.2; 73/178 R; 345/650; 382/276, 293, 298
See application file for complete search history.

(56) References Cited
U.S. PATENT DOCUMENTS

| | | | |
|---|---|---|---|
| 4,969,201 A * | 11/1990 | Takasaki et al. ............ 382/199 |
| 5,089,826 A | 2/1992 | Yano et al. |
| 6,006,161 A * | 12/1999 | Katou ............ 701/212 |
| 6,321,158 B1 * | 11/2001 | DeLorme et al. ............ 701/201 |
| 7,474,960 B1 * | 1/2009 | Nesbitt ............ 701/209 |
| 2004/0254840 A1 * | 12/2004 | Slemmer et al. ............ 705/22 |
| 2005/0166112 A1 * | 7/2005 | Okada et al. ............ 714/735 |
| 2006/0073862 A1 * | 4/2006 | Shinoda et al. ............ 463/1 |

* cited by examiner

*Primary Examiner*—Jack Keith
*Assistant Examiner*—Muhammad Shafi
(74) *Attorney, Agent, or Firm*—Brinks Hofer Gilson & Lione

(57) ABSTRACT

A map moving apparatus capable of performing desired map movement by a simple input operation without requiring a continuous operation by a user in moving a map screen display region is disclosed. An operated direction, an operated position, an operated speed and the like are detected from an input operation that a user performs on the map screen display region, and a map screen display region input shape recognizing section recognizes an input shape. A polygon shape identifying section extracts data having substantially the same shape as the recognized input shape from polygon data in map display data by using a matching method. When data having substantially the same shape exists, a type of the polygon is identified. In a movement mode selecting section, the movement of a screen map reverses direction when it reaches an end portion in the case where the polygon type is a linear shape, and the movement circulates to continue movement of the map screen where the type is a ring shape with no end portion. In the case where guidance information is detected during the movement of the map, guidance is provided on a screen or by voice.

18 Claims, 8 Drawing Sheets

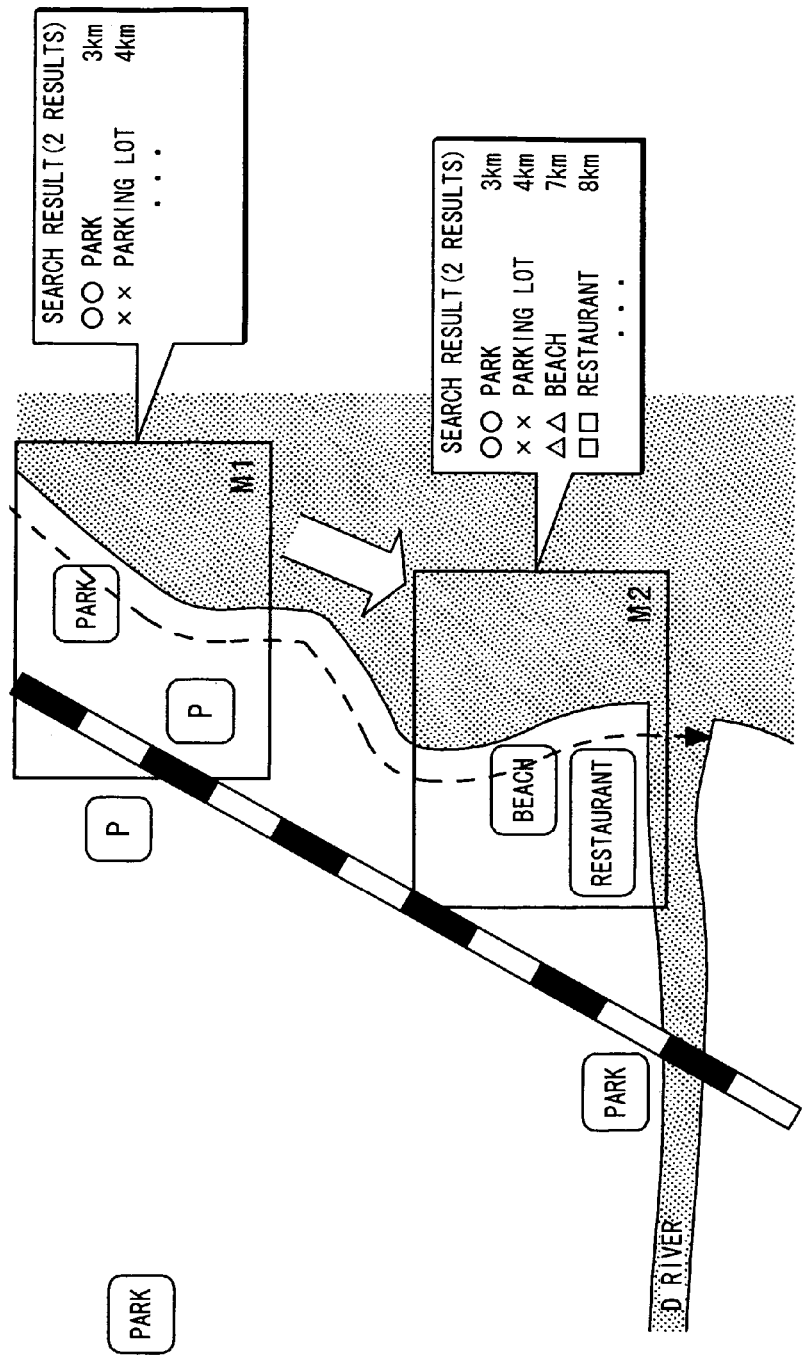

MAP MOVING APPARATUS

BACKGROUND OF THE INVENTION

1. Related Applications

The present application claims priority to Japanese Patent Application Number 2005-297043, filed Oct. 11, 2005, the entirety of which is hereby incorporated by reference.

2. Field of the Invention

The present invention relates to a map moving apparatus capable of automatically moving a map screen display region along a particular display polygon by using a simple operation of a user.

3. Description of the Related Art

In recent years, installing a navigation apparatus in a vehicle has become widely known. A regular navigation apparatus to be installed in a vehicle or the like includes a map/information storage medium such as a CD-ROM, a DVD-ROM or a hard disk, which stores map data for drawing a map and facility data for searching a facility or the like; a data retrieval device that retrieves the data from the map/information storage medium; a monitor that displays a map or the like; and a vehicle position detecting device that detects the current position and the orientation of an advancing direction of a vehicle by using an autonomous navigation apparatus, which uses a GPS receiver, a travel distance sensor, a gyroscope and the like, in which the navigation apparatus retrieves map data covering the current position of the vehicle from the map/information storage medium, draws a map image of an area around the vehicle position on a monitor screen based on the map data, displays a vehicle position mark at the center or a particular position of the monitor screen, moves the map image in response to the movement of the vehicle or moves the vehicle position mark while the map image is fixed on the screen, and allows a user to recognize the current position of the vehicle at a glance.

The map data stored in the map/information storage medium such as the CD-ROM, the DVD-ROM or the hard disk is sectioned into a longitude width and a latitude width of a proper size according to various scale levels, and polygons such as a road displayed on a map are stored as a coordinate set of nodes that are expressed by longitude and latitude. Further, the map data includes a road layer made up of a road list, a node table or the like, a background layer made up of polygon data for displaying roads, buildings, facilities, parks, rivers and the like on the map screen, character data for displaying characters, map signs and the like such as an administrative district name of a city, town and village, a road name, an intersection name, a facility name, and the like.

The road list and the node table are organized by a certain unit region (parcel or mesh). Nodes included in the node table are information of points, and they consist of information identifying the positions of points and the types of points such as highway junctions and road intersections. Road links included in the road list constitute information describing roads, and they consist of the starting point and the ending point of a road, and the length/attributes of the road. Generally, the starting point and the ending point of a road link are expressed as nodes, and the attributes include the type and the width of the road such as a highway and an open road. The navigation apparatus is capable of displaying maps from a wide range to a narrow range in various scales by using the above-described map data, but it cannot display detailed information when displaying a wide range (small scale), and it becomes difficult to grasp the entire image, that is, a positional relationship with surrounding areas when displaying a narrow range (large scale) due to the characteristics of the map database and navigation apparatus, so that a user arbitrarily selects a scale considered to be most appropriate, to display a map on the map screen.

Further, a typical navigation apparatus includes a route guiding function to allow a user to easily travel on a road toward a desired destination without making a mistake. According to the route guiding function, a destination can be set by various means, and the navigation apparatus calculates an appropriate route from an origin to a destination from possible routes connecting the points by taking into consideration various conditions, such as types of roads to be used, travel distance, travel time and tolls, to which the user wants to place priority, and presents it to the user. Further, the navigation apparatus stores a route that the user selects as a guiding route, displays the guiding route on the map image with a bold line in a different color from other roads while traveling, displays an intersection at which a direction on the guiding route should be changed in an enlarged state when the vehicle approaches the intersection within a certain distance, and draws an arrow or the like indicating a direction change to display it on the screen or guides the vehicle for a right/left turn by voice, and thus can guide the user to the destination. A technique in which a map is automatically scrolled along a route that was previously set to perform display from an origin to a destination is disclosed in Japanese Patent Laid-Open No. 07-55482 publication. However, in this technique, since a map screen display region is moved along a route, it is impossible to provide the user with information regarding points that do not exist near the route.

In such a navigation apparatus, when the user tries to find restaurants along the road on which the user is traveling, for example, it is possible to check the presence of restaurants along the road because the user can see the area near the particular road currently displayed on the map screen. However, if no restaurant exists along the road on the map currently displayed on the screen, the user needs to move the map screen display region along the road to find restaurants along the road.

When changing a display region of the map in the conventional navigation apparatus, the user specified a direction of moving the screen by using a touch panel function on the display screen or an input device such as a scroll key on a remote controller to move the screen away from a currently displayed screen region along the particular road, and searched for restaurants along the road or near the road, so that a problem arose that the operation became troublesome to the user.

Furthermore, in the case where the user will travel around a lake and wants to know the presence of a road closure that exists on the road around the lake or the positions of facilities such as shops and restaurants around the lake, if only a part of the lake is displayed on the current display screen, the user searches the road closure, shops and restaurants around the lake on the map while moving the map screen display region along the lake by the above-described manual operation, so that a problem existed of reducing safety during traveling.

As described above, in a map screen display device such as the conventional navigation apparatus, when a user tries to check the state of an arbitrary road ahead or the state of a road around a lake or a park, the user checks the road state and the type or the position of a facility nearby by moving the display screen region of map such that a road or a point that the user wants to refer to is displayed on a screen. Further, in the case of checking the presence of a road around a mountain, river or coast, or searching for a tourist facility around it while traveling, the user obtains the information from a map as the user moves the map along the mountain, river or coast.

When the user wanted to obtain information around a certain target such as a road, river or coast, for example, the user continuously operated the navigation apparatus until the required information was obtained, and this caused a problem of not only applying a burden to the user but also interrupting safe driving when the user is driving a car. In addition to the map screen display device such as the navigation apparatus, the same burden applies to the case of displaying a map on a personal computer and moving the screen display region of the map, for example.

SUMMARY OF THE INVENTION

Therefore, it is a primary object of the present invention to perform a desired map movement by a simple input operation without continuously performing an operation for moving a map screen display region and to provide guidance information according to the movement of the map screen display region.

One embodiment of a map moving apparatus according to the present invention includes shape recognizing means for recognizing a shape that a user inputs to the map screen display region; polygon shape identifying means for identifying a polygon figure approximating the input shape by comparing polygon figures that consist of polygon data, which are displayed on the map screen, with the input shape; and map moving processing means for moving the map screen display region along the identified polygon figure.

Further, another embodiment of a map moving apparatus according to the present invention includes polygon type identifying means for identifying whether the polygon figure is a linear polygon having end portions or a ring polygon; and polygon moving means for moving the map screen display region in an opposite direction when the map screen display region reaches the end portion, if the polygon type identifying means identifies the polygon figure as a linear polygon.

Further, another embodiment of a map moving apparatus according to the present invention includes polygon type identifying means for identifying whether the polygon figure is a linear polygon having end portions or a ring polygon; and polygon moving means for stopping the movement of the map screen display region when the map screen display region reaches the end portion, if the polygon type identifying means identifies the polygon figure as a linear polygon.

Further, another embodiment of a map moving apparatus according to the present invention includes polygon type identifying means for identifying whether the polygon figure is a linear polygon having end portions or a ring polygon; and polygon moving means for moving the map screen display region in a circulating manner along the ring polygon, if the polygon type identifying means identifies the polygon figure as a ring polygon having no end portion.

Further, another embodiment of a map moving apparatus according to the present invention includes polygon type identifying means for identifying whether the polygon figure is a linear polygon having end portions or a ring polygon, in which the map movement is stopped after the map screen display region completely traverses the ring polygon, if the polygon type identifying means identifies the polygon figure as a ring polygon having no end portion.

Furthermore, another map embodiment of a moving apparatus according to the present invention includes input speed detecting means for detecting the speed at which the user inputs a shape to the map screen display region; and moving speed setting means for setting a speed at which the map screen display region is moved based on the speed at which the shape was input.

Further, another embodiment of a map moving apparatus according to the present invention includes input direction detecting means for detecting a direction that the user inputs a shape to the map screen display region; and moving direction setting means for setting a direction in which the map screen display region is moved as the direction in which the shape was input.

Further, another embodiment of a map moving apparatus according to the present invention includes map moving processing means for moving the map screen display region such that the center of the map screen display region corresponds to a part of the polygon figure identified by the polygon shape identifying means as approximating the input shape.

Further, another embodiment of a map moving apparatus according to the present invention includes polygon shape identifying means for selecting the most approximate polygon figure when the polygon shape identifying means detects that a plurality of polygon figures, whose shapes approximate a shape recognized by the shape recognizing means, exist.

Further, another embodiment of a map moving apparatus according to the present invention includes guidance information providing means for providing guidance information to the user on a screen or by voice when guidance information exists in the moving map screen display region.

Further, another embodiment of a map moving apparatus according to the present invention includes moving speed setting means for decreasing the map moving speed when guidance information exists.

Further, another embodiment of a map moving apparatus according to the present invention includes map/information retrieval means for retrieving guidance information by remote communication.

Further, another embodiment of a map moving apparatus according to the present invention accumulates and provides guidance information according to the movement of the map.

Further, another embodiment of a map moving apparatus according to the present invention includes guidance information selecting means for selecting and providing guidance information of a type that the user previously set.

Further, another embodiment of a map moving apparatus according to the present invention includes guidance information providing means for searching and providing nearby parking lots when the figure that consists of polygon data is a building and the map is moved along the building polygon.

Further, another embodiment of a map moving apparatus according to the present invention searches and provides one of an entrance, an exit and a restaurant when the figure that consists of polygon data is a parking lot and the map is moved along the parking lot polygon.

Furthermore, another embodiment of a map moving apparatus according to the present invention is implemented as a navigation apparatus for vehicle use.

Further, in another embodiment of a map moving apparatus according to the present invention, by storing a pseudo polygon indicating a tourist site in the map database, the map is moved along the pseudo polygon when a destination included therein is set in the navigation apparatus.

Still further, another embodiment of a map moving apparatus according to the present invention includes map displaying means for dividing a map display screen into two when the map is moved along the identified figure, displaying a detailed map including the identified figure on one side, and displaying a wide area map including a map display region on the other side.

As described above, one aspect of the present invention is that the map screen display region moves along a selected polygon by a simple operation of the user, so that the user can easily find facilities or the like around the selected polygon from the map. Further, since the map screen display region moves along the selected polygon, the user can obtain detailed geographic information around the polygon and traffic information such as traffic congestion and traffic control without continuously operating the navigation apparatus. Moreover, the user can obtain information of a road or a coastline ahead, on which he/she is traveling without continuously operating the navigation apparatus, so that safety during traveling can be improved even when a driver operates the apparatus.

Furthermore, in the case where traffic congestion or traffic control occurs in a particular area, guidance can be performed by temporarily stopping the movement of the map or reducing the movement speed, so that the user can easily obtain information about an incident occurring in the area that the user wanted to refer to.

BRIEF DESCRIPTION OF THE DRAWINGS

FIG. 7 is a fourth illustration showing an operation of the present invention in a map screen example.

FIGS. 8(a), 8(b) and 8(c) are views showing the situation where a user inputs a shape, in which FIG. 8(a) is an initial input screen, FIG. 8(b) is a screen when the shape of a road polygon is input, and FIG. 8(c) is a screen when the shape of a lake polygon is input.

DESCRIPTION OF THE PREFERRED EMBODIMENTS

As described above, in moving a map screen display region, the present invention performs map movement that the user desires by a simple input operation without performing a map moving operation continuously and provides a variety of guidance information according to the movement of the map screen display region, by including: input shape recognizing means for recognizing a shape that a user inputs to the map screen display region; polygon shape identifying means for identifying a polygon figure approximating the input shape by comparing polygon figures that consist of polygon data, which are displayed on the map screen, with the input shape; and map moving processing means for moving the map screen display region along the identified polygon figure, and by retrieving and providing a variety of guidance information according to the movement of the map screen display region.

Embodiment 1

Figure 4:
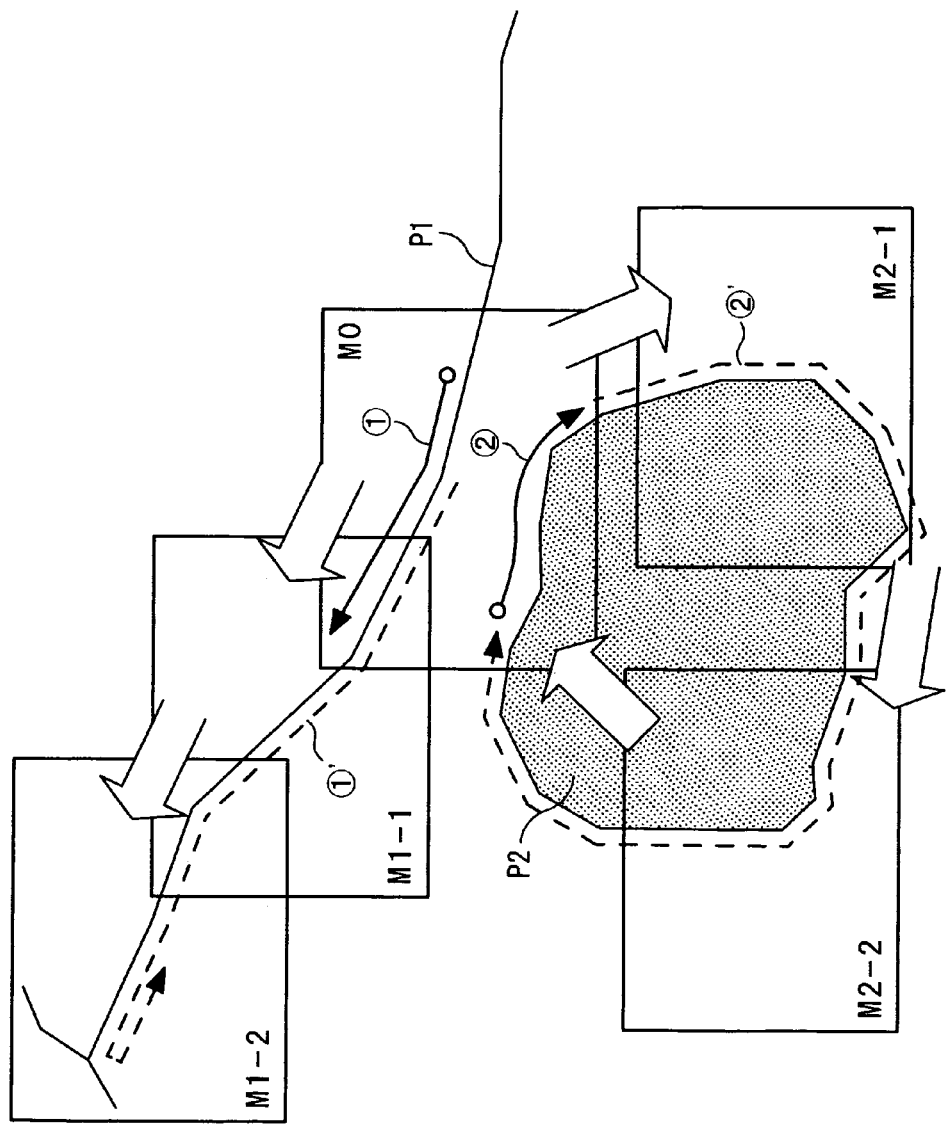
FIG. 4 is a first illustration showing an operation of the present invention by a map screen example.

A description will first be made for a map moving method according to the present invention based on a specific example. FIG. 4 shows an example of the operation of the present invention. Rectangular shapes represent map display regions on a screen. Reference numerals (1) and (2) represent shapes that the user inputs, and P1 and P2 show polygons selected by the present invention based on the shapes (1), (2) that the user inputs.

A polygon comprises positional information of a polygonal shape formed by connecting a plurality of points expressed by coordinate values such as longitude and latitude, and it is the same as polygonal shape data that is generally used to display boundaries or the like of administrative districts on a map. A polygon is used to display a region showing land formations such as a mountain, river, lake, desert and reservoir, buildings such as a shopping mall, an airport and a school, and their regions, in map data for navigation use, and it has been conventionally used widely particularly for high-speed drawing of a map.

The map screen moves as shown by reference numerals (1)' and (2)' along the contour or shape of polygons P1 and P2. M0 is the map screen that is currently displayed, M1-1 and M1-2 show the moving state of the map screen by the present invention when the user inputs (1), and M2-1 and M2-2 show the moving state of the map screen by the present invention when the user inputs (2).

As shown in FIG. 4, in the map moving method according to the present invention, when the user inputs a shape of a target such as road, railroad or lake displayed on the screen, for example, for which he/she wants to check the state of its peripheral area, by using a touch panel or a remote controller, a polygon having a shape closest to the shape that the user inputs is selected from polygons displayed on the screen, and the map is moved along the selected polygon.

For example, in the case where the user inputs the shape (1), the display region is moved (M0→M1-1→M1-2) such that the road polygon P1 is always displayed in the center of the map as shown by (1)'. When the selected polygon is a linear polygon such as a road polygon, the display region moves to the terminal end of the road as shown in M1-2, and starts moving in the opposite direction (U-turn). By this action, the user can continuously refer to the state and the shape of the selected road such as a national road or prefectural road, for example, without further operations.

On the other hand, in the case where the user inputs the shape (2), the display region is moved (M0→M2-1→M2-2→M0) such that the edge of the lake polygon P2 is always displayed in the center of map. When a target polygon is a ring polygon of a closed shape like P2, the movement of the map can be continued until the user gives a stop instruction. By this action, the user can refer to the state of a road around a lake, park, amusement park or the like, and the position of facilities that exist around them without further operating the navigation apparatus.

When the shape that the user inputs as described above is matched with various types of polygons displayed in the map screen display region to select a polygon, a conventional shape matching method using minimum mean square error, for example, and other various types of method may be used. All shape information contained in the map database, e.g., outlines such as a mountain, river, ocean, lake, premises of an amusement park or the like, administrative boundaries of a prefecture, city, ward, town and village, railroad, sea lane of a ferry, and buildings, which are displayed on a map, can be used as targets of matching.

Figure 5:
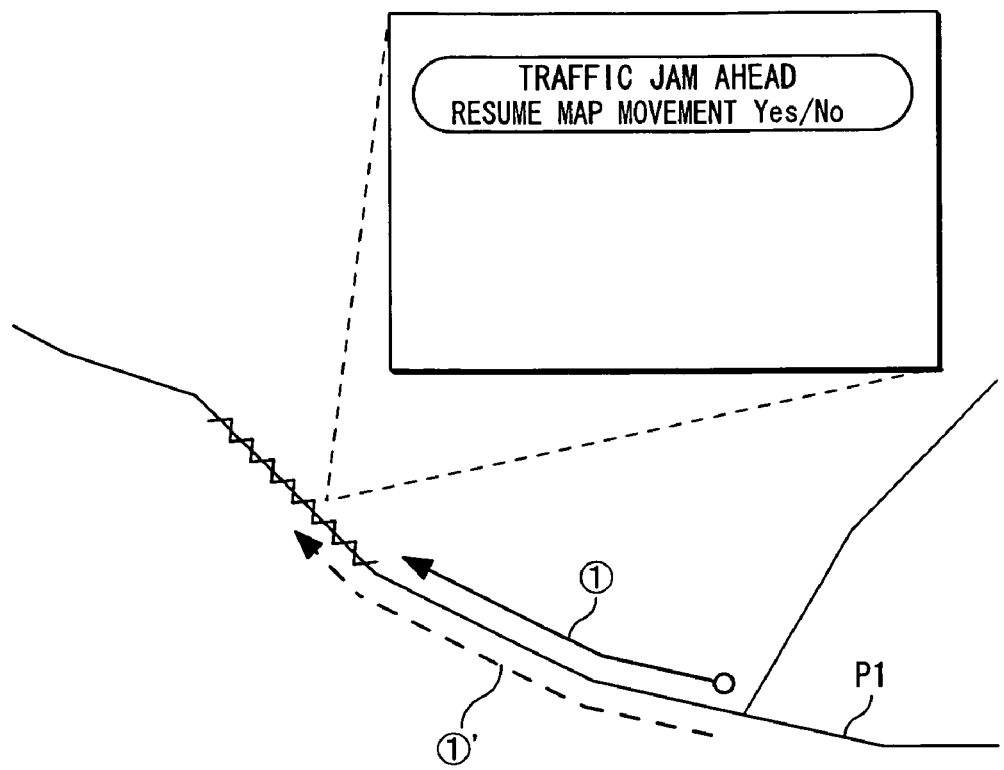
FIG. 5 is a second illustration showing a guidance output example of traffic information in the present invention.

Next, guidance action will be described. FIG. 5 shows the guidance action in the case where traffic congestion occurs on the selected road. A rectangular shape shows a display example of guidance on the navigation apparatus. As shown in the drawing, when traffic congestion or traffic control occurs on the selected road, the movement of the map is temporarily stopped at the point of the traffic congestion or the moving speed of the map is reduced, and information about the traffic congestion or traffic control is provided by voice or an image. In the case where the selected target is an ocean, river, lake or the like, various alerts or warnings of tsunami, flood or the like around the target are provided. When the map screen is stopped after information is provided, the present invention asks the user if he/she wishes to continue map movement.

The speed of moving the map may be determined by the speed at which the user inputs the shape, and the moving speed may be increased with the time taken from a point where the map movement started as in the conventional navigation apparatus.

Figure 6:
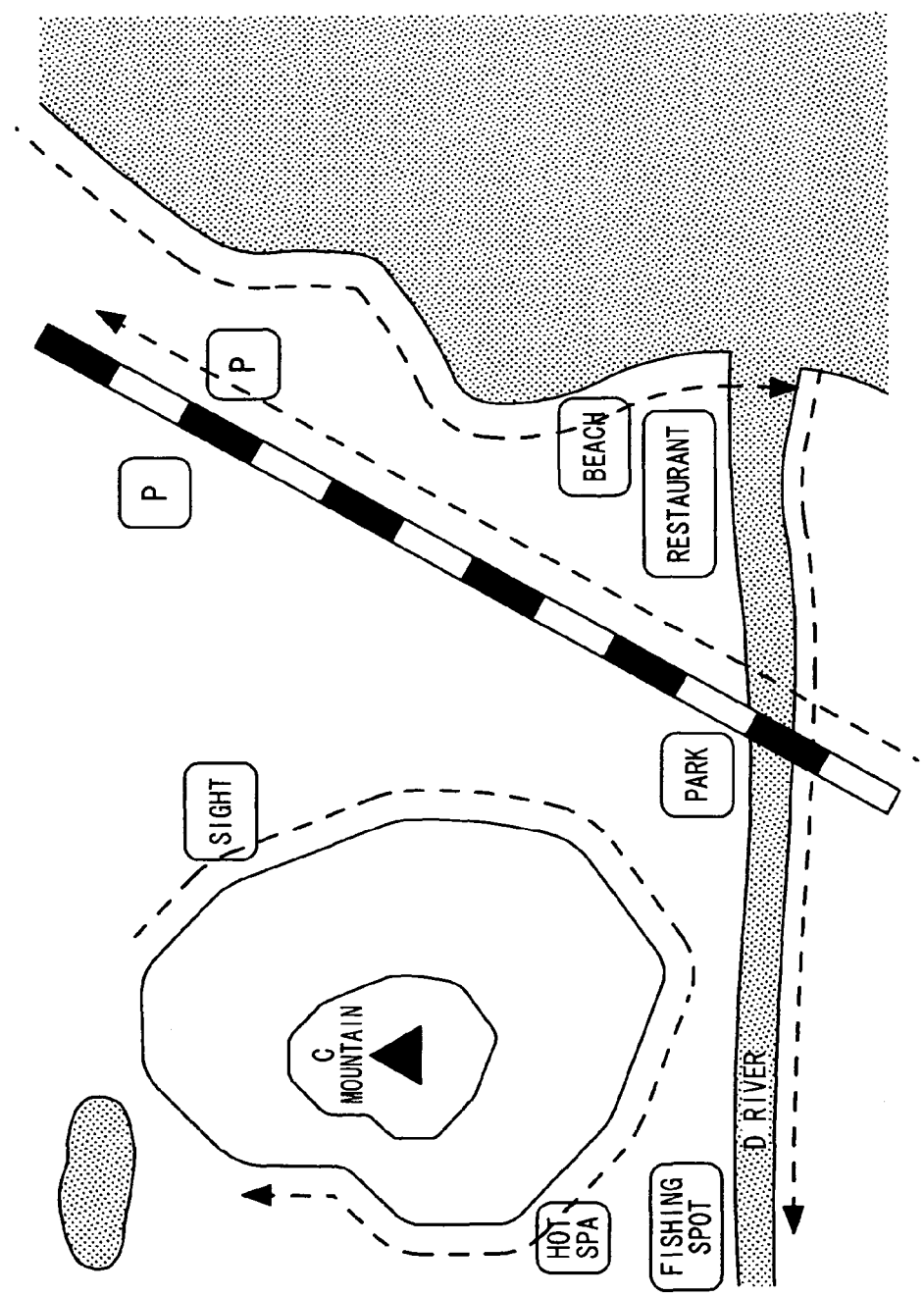
FIG. 6 is a third illustration showing an operation of the present invention in a map screen example.

FIG. 6 illustrates an example using the present invention. Broken lines show the path along which the map moves. Squares such as park and hot spa show facilities. As shown in the drawing, since the map can be moved along polygons such as a mountain, river and coast displayed on the map by using the present invention, it becomes possible to search for facilities around a tourist site such as a hot spa and around a mountain or to easily search a beach or restaurant along a coast or river.

Moreover, by using information such as isobaric lines obtained via the Internet, the user can easily check bad weather areas by moving the map along isobaric regions. As described above, by using figures displayed on the map as information for moving the map, the user can check the state of a road, facility, or tourist site around it, which he/she wants to refer to, with an easy operation.

Figure 1:
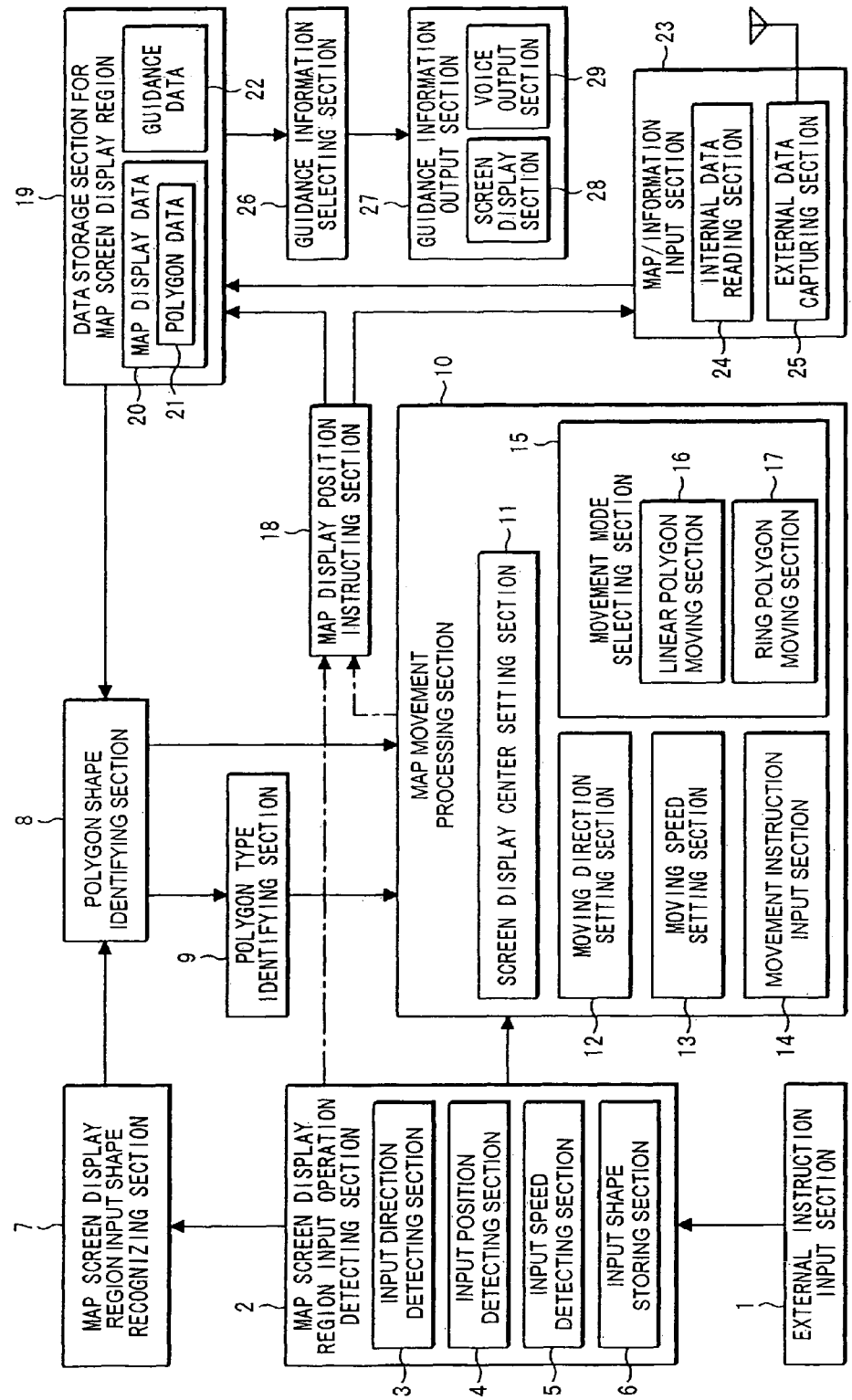
FIG. 1 is a functional block diagram of an embodiment of the present invention.
Figure 2:
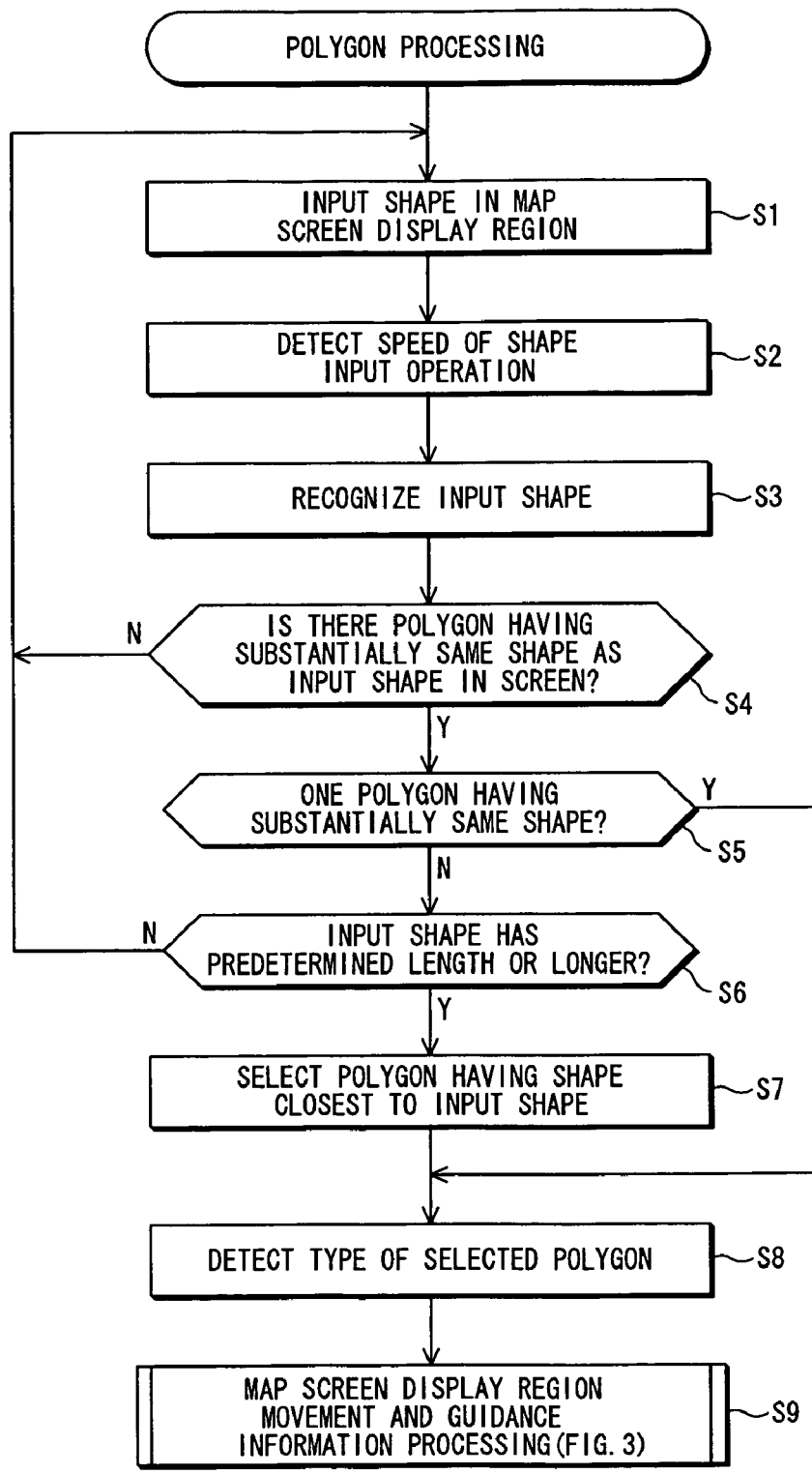
FIG. 2 is a flowchart of polygon processing in the embodiment.
Figure 3:
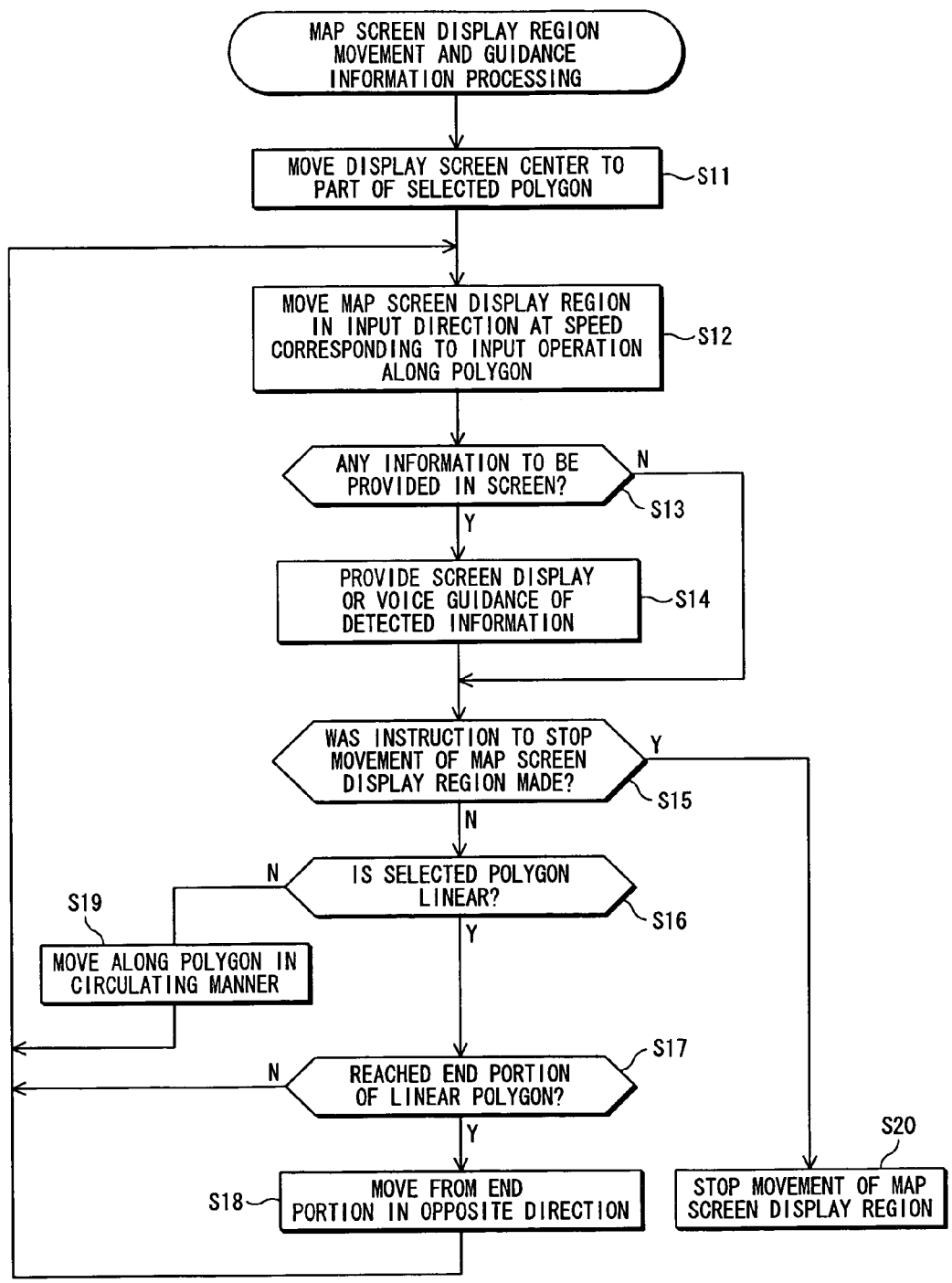
FIG. 3 is a flowchart of map screen display region movement and guidance information processing in the embodiment.

The above-described operations of the present embodiment of the invention can be implemented by the functional block configuration shown in FIG. 1, and the flowcharts shown in FIG. 2 and FIG. 3, for example. Specifically, FIG. 1 shows the functional block diagram of an embodiment of the present invention, and it shows various functional blocks in order to implement the present invention in various modes. Note that functional sections performing each function in this drawing can be called means for performing each function.

The embodiment shown in FIG. 1 includes an external instruction input section 1 to which the user inputs various instructions, and when the user wants to know the position/type of facilities that exist along a road around a current position or wants to know the road state around a lake or the presence and the positions of facilities around the lake when driving around the lake, for example, the external instruction input section 1 converts a contour or a shape, which was input by tracing the road or the lake on the map currently displayed by using a touch panel or a joystick of a remote controller, into signals and supplies them to a map screen display region input operation detecting section 2.

The map screen display region input operation detecting section 2 includes an input direction detecting section 3 in the embodiment shown. When an input operation in the map screen display region is made by the user via the external instruction input section 1, the section 3 detects the direction of the input operation. Further, an input position detecting section 4 detects a position on the map, which is near the origin of the input operation by the user, and an input speed detecting section 5 detects the speed of the input operation by the user.

The map screen display region input operation detecting section 2 further includes an input shape storing section 6. When the user inputs a predetermined shape by using the touch panel or the joystick of the remote controller, the section 6 stores the input points in order and stores an input shape that was input by the user. The data can be stored as coordinates on the screen in the map screen display region if it was input by the touch panel, for example, or can be stored as the movement of positional coordinates on the map if it was input by a joystick of the remote controller.

Figure 8A:
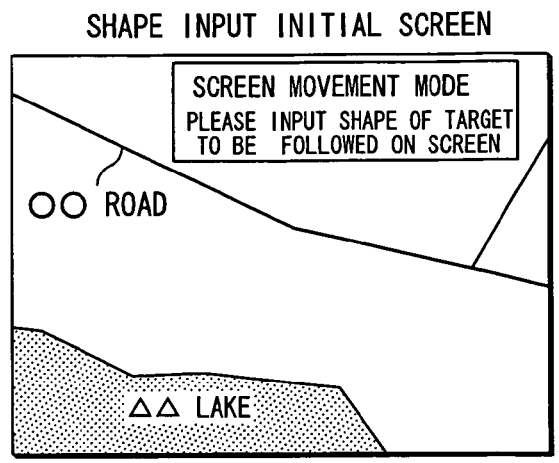
Figure 8B:
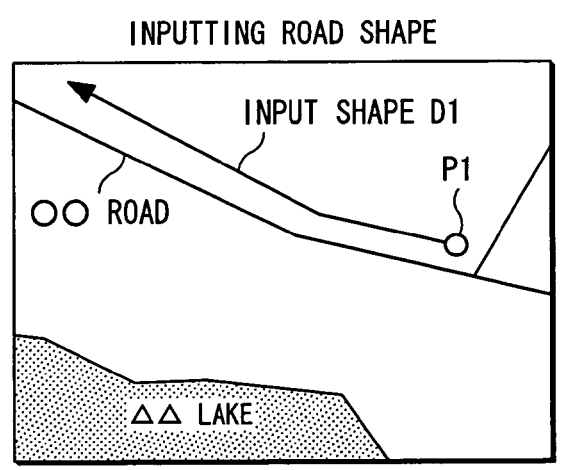
Figure 8C:
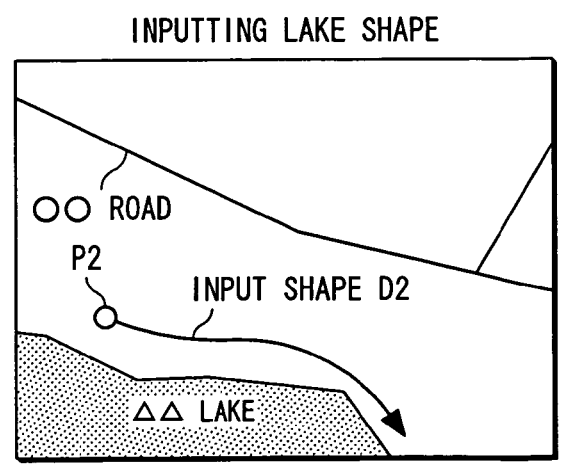

The input operation is performed as shown in FIG. 8, for example. Specifically, in the example of FIG. 8, a screen moving mode is turned on when the map screen is shown as in FIG. 8(a), the user inputs a shape like an input shape D1 from an origin P1 as shown in FIG. 8(b), or inputs a shape like an input shape D2 from an origin P2 as shown in FIG. 8(c) via the touch panel or the like. These positional data being input are detected by the input position detecting section 4 of the map screen display region input operation detecting section 2, and stored in the input shape storing section 6 in order. Further, the input direction detecting section 3 detects the input direction at that point, and the input speed detecting section 5 detects the input speed at that point.

In making the above-described input, other than the input of a predetermined shape via the touch panel as described above, for example, in a navigation apparatus including a function where a cursor is moved near a road in the map screen display by the joystick of the remote controller and the map screen is moved by moving the cursor along the road, a predetermined shape may be input by properly moving the cursor along the road. In that case, an arbitrary polygon on the screen may be selected by inputting a predetermined shape by moving the cursor a proper distance along the edge of a lake.

A map screen display region input shape recognizing section 7, based on the data stored in the input shape storing section 6 of the map screen display region input operation detecting section 2, recognizes the data as an input shape. A polygon shape identifying section 8 compares the input shape with polygon data 21 contained in map display data 20, which is stored in a data storage section for a map screen display region 19, as described later, and selects a polygon closest to the shape that the user inputs. In identifying the shape, a conventional shape matching method using minimum mean square error, or other types of conventional methods can be used.

When the polygon shape identifying section 8 identifies a particular polygon out of the stored polygons, a polygon type identifying section 9 identifies a type of the polygon, e.g., a road polygon or a lake polygon, and supplies the identification result to a map movement processing section 10.

The map movement processing section 10 performs processing to move the map screen display region corresponding to the identified polygon as described above. When the shape that the user inputs to the polygon shape identifying section 8 matches part of a polygon on ○○ road as shown in FIG. 8(b), for example, a screen display center setting section 11 in the section 10 performs movement processing of the screen so as to display a part of the road in the center of a currently displayed screen. Further, when the shape matches part of the polygon of △△ lake as shown in FIG. 8(c), the section 11 performs movement processing of the screen so as to display a part of the lake edge in the center of the currently displayed screen.

In performing movement processing, the display region may be moved such that an area of the selected road or the lake rim, for example, closest to the display center of the screen is brought to the display center of the screen or, alternatively, may be moved such that a road area near the input origins P1, P2 created by the user is brought to the screen center.

When moving the map screen display region along the polygon, a moving direction setting section 12 sets the moving direction, and in setting the direction, the direction is set to be the same direction detected by the input direction detecting section 3. Thus, when the input operation as shown in FIG. 8(*b*) is performed, for example, the input direction detecting section 3 detects the arrow direction, and the moving direction setting section 12 moves the polygon in the screen display moving direction (1)' of FIG. 4 after displaying part of the polygon in the screen display center through the screen display center setting section 11.

A moving speed setting section 13 sets the moving speed of the map screen display region. Various methods can be employed in setting the moving speed. An operation speed in making the input operation which was detected by the input speed detecting section 5 can be used, and the map screen display region may be moved along the polygon at a speed corresponding to the operation speed. In such a case, the map screen display region moves fast when the user performed the input quickly, and the map screen display region moves slowly when he/she performed the input slowly. In setting the moving speed, a method such that the initial speed is slow and the moving speed gradually is made faster as partially performed in the map screen display of a conventional navigation apparatus, for example, can be employed.

A movement instruction input section 14 controls the movement of the map screen display region by the user's instruction of stopping the movement of map screen display region and resuming movement after the stop. In addition, the section 14 may be set to stop and resume movement such that the movement is stopped when guidance information to the user exists while the map screen display region is being moved, and an instruction to resume movement, or a method of automatically resuming movement after passing a predetermined time is performed.

A movement mode selecting section 15 selects a movement mode of the map screen display region according to the type of polygon identified by the polygon type identifying section 9, such as a linear polygon having end portions like a road or a ring polygon having no end portion like a lake, for example. In setting the movement mode, a linear polygon moving section 16 sets the moving mode so as to reverse direction at the end portion of the road as shown in the movement on the road polygon of FIG. 4, for example, in the case of a linear polygon. A ring polygon moving section 17 sets the moving mode to circulate the edge of the lake until the user's stop instruction is given as shown in the movement along the edge of the lake polygon of FIG. 4 in the case of a ring polygon. In addition, another setting can be made such that movement stops when the end portion is reached in the case of a linear polygon and stops when the movement completes a circuit around the lake in the case of a ring polygon.

In automatically moving the map screen display region according to the polygons as described above, in order to obtain map data corresponding to the movement and perform map screen display, a map display position instructing section 18 notifies a map/information input section 23 and a data storage section for map screen display region 19, in which data for actually performing the screen display exist, of the points that the map movement processing section 10 specified.

In the map/information input section 23, an internal data reading section 24 reads data of a predetermined range near the specified points from the map/information storage medium such as a CD, a DVD or a HDD that the navigation apparatus includes therein, and the data storage section for map screen display region 19 retrieves data of the map screen display region corresponding to a map display position and a map scale. Map display data 20 is the data of the map screen display region that the data storage section for map screen display region 19 retrieved and is mainly used for screen display, and guidance data 22 is provided to a guidance information selecting section 26 described later.

The polygon data 21 also exists in the map display data 20 that was retrieved as described above. The map movement processing section 10 performs the process of moving the map screen display region according to the polygon by using the polygon data, and thus the desired movement of the map screen display region is made. Meanwhile, the polygon data 21 is also used in the polygon shape identifying section 8 for comparing with the shape that the user inputs, which the map screen display region input shape recognizing section 7 recognized, as described above in detail.

Regarding the guidance data 22, in addition to various types of facility information retrieved by the internal data reading section 24 as described above, various types of external information near the points specified by the map display position instructing section 18 can be retrieved by an external data capturing section 25. For example, the section 25 can obtain traffic information containing road information corresponding to the map display position via VICS or the like, store such information in the guidance data 22 if the information exists, and when the guidance information selecting section 26 determines that the stored guidance data is information to be produced, it can be produced from a guidance information output section 27. By the above-described action, the traffic information as shown in FIG. 5 can be provided.

The external data capturing section 25 can obtain isobaric lines or front data from the weather information obtained by using the Internet, and can also store them as polygon data 21 for displaying such data as isobaric lines and a weather front on the map. The data is retrieved when the map display position instructing section 18 notifies the external data capturing section 25 of the positional information obtained from the map screen display region input operation detecting section 2. Moreover, when the user performs an input operation along the isobaric lines or the front displayed on the screen, for example, the map screen display region can be moved along the isobaric lines or the front displayed on the screen.

Regarding the data to be retrieved by the external data capturing section 25, a setting can be made so as to retrieve other types of information. For example, tsunami information, active fishing spots, no swimming information, fireworks information and the like can be also retrieved when a target polygon is a coast line, and flood information, river bank athletic facility information, fishing information and the like can be retrieved as well when a target polygon is a river.

Such guidance information is stored as guidance data 22. The guidance information selecting section 26 selects arbitrarily requested information from among the stored information and supplies it to the guidance information output section 27. Note that as information to be stored as guidance data 22, only information previously selected by the guidance information selecting section 26 may be stored. The guidance information output section 27 provides data for screen display from a screen display section 28 and provides data announced by voice from a voice output section 29.

The above-described embodiment of the present invention can be operated according to the flowcharts shown in FIG. 2 and FIG. 3, for example. In the example of polygon processing shown in FIG. 2, the user first inputs a shape in the map screen display region (step S1). The shape is input by a touch panel operation, a cursor moving operation, or the like as described above. Next, shape input operation speed is detected (step S2), and the input shape is recognized after that (step S3).

Subsequently, the presence of polygons having substantially the same shape as the input shape on the screen is determined (step S4). This determination is made by performing the above-described processing by the polygon shape identifying section 8 of FIG. 1. Further, since this determination is begun being performed immediately after the user starts inputting the shape, the determination may not be made until the middle of input, so that it is often the case that an appropriate shape cannot be found at the initial stage of input. Therefore, if it is determined that a polygon having substantially the same shape has not been found yet, processing returns to step S1 again to continue performing shape input in the map screen display region.

When it is determined that polygons having substantially the same shape as the input shape are found in the screen at step S4 by continuance of the action, the number of polygons having substantially the same shape is determined (step S5). Processing proceeds to step S8 when it is determined that only one polygon exists. Alternatively, if it is determined that the input shape has a predetermined length or longer when a plurality of polygons whose shapes are close to the input shape were found (step S6), processing returns to step S1 again when it is determined that the input shape is not long enough, and the processing from step S1 to step S6 is repeated.

When it is determined that a plurality of polygons having substantially the same shape exist at step S5 and the input shape is a predetermined length or longer, a polygon having the closest shape to the input shape is selected as a polygon having the shape input by the user (step S7).

At step S8, the type of the selected polygon is determined (linear polygon having end portions or ring polygon with closed outline), and it can be used as data for changing a moving mode of the map screen display region. In addition, even when the selected polygon is a linear polygon, an identification as to whether it is a road polygon, a river polygon or the like may be performed, and even when it is a ring polygon, an identification as to whether it is a lake polygon, a contour line polygon, an isobaric line polygon or the like may be performed, and thus information for guidance can be sorted appropriately by the identified data. Next, the movement of the map screen display region along the polygon and guidance information processing are performed as shown in FIG. 3 (step S9).

In performing the processing shown in FIG. 3, a display screen center is first moved to a part of the selected polygon (step S11). In this case, a part of the polygon closest to the display screen center may be moved to the screen center, although various other methods can be used such that a part of the polygon close to the origin of the instructed input of the user is moved to the display screen center. This action is performed in the screen display center setting section 11 of the map movement processing section 10 of FIG. 1. Meanwhile, by such a movement operation of the screen, the user knows that the map screen display region will move along the polygon that exists at the screen center, can stop the action when he/she finds that the polygon is not the desired polygon, and can perform an operation of starting the process again.

Subsequently, the map screen display region is moved along the polygon in a direction that the input operation was made at a speed corresponding to the input operation (step S12). When it is detected that information to be provided is in the screen during the movement (step S13), the detected information is provided as a screen display or by voice guidance (step S14). Particularly, in providing voice guidance, a setting may be made so as to provide information requiring special attention such as emergency information.

If it is determined that no information to be provided is in the screen at step S13, the presence of an instruction to stop the movement of map screen display region is determined (step S15). When it is determined that the user has made the stop instruction, processing proceeds to step S20 to stop the movement of the map screen display region. After that, although not shown, movement processing can be resumed by an instruction to start movement again, or the like. When it is determined that an instruction to stop the movement of map screen display region has not been made yet at step S15, the type of the selected polygon (linear polygon or ring polygon) is determined (step S16), whether or not the movement has reached the end portion of a linear polygon is determined when it is determined that the polygon is a linear polygon such as a road (step S17), and processing returns to step S12 when the movement has not reached the end portion to continue movement along the polygon in the map screen display region.

When it is determined that the movement has reached the end portion of the linear polygon at step S17, the movement from the reached end portion begins in the opposite direction in this embodiment (step S18). By repeating the same action, the movement may be set so as to return by making a U-turn when it reaches the opposite end portion of the road. Note that a setting may be made such that processing proceeds to step S20 to stop the movement of the map screen display region when movement reaches the end portion of a linear polygon.

In the case where it is determined that the selected polygon at step S16 is not a linear polygon, that is, the selected polygon is a ring polygon, processing proceeds to step S19 to move along the ring polygon, and the movement is performed in a circulating fashion along the polygon in this example. Then, returning to step S12, the action is continued until an instruction to stop the movement of the map screen display region is made at step S15.

Although the present invention is capable of performing the process explained above, the present invention can be implemented in various other modes. FIG. 7 shows another mode of the present invention, in which the broken line arrow shows the state of map movement, and M1 and M2 show display regions of a map on the screen at selected points. Further, the right dialog balloons show a search result displayed on the screen as stored in the guidance data 22.

As shown in FIG. 7, in the case where the user moves the map along a coast line, information of facilities or the like displayed on the screen is displayed on the screen. When the user starts the movement of the map by using the present invention and the region of M1 is displayed on the screen of the navigation apparatus, ○○ park and ×× parking lot, which are included in M1, are displayed as a search result together with distance. When he/she further continues the movement of map and M2 is displayed on the screen, △△ beach and □□ restaurant are added to the search result.

In the above-described example, the information of facilities displayed on the screen with the movement of the map can be provided for the user while the information is sequentially added. Consequently, the user can easily set a destination or a route from the search result. Further, the above-described search result may be displayed only when the user requests.

As described above, it becomes possible to collect information regarding facilities such as a restaurant on a coast or a parking lot along a railroad, which exist around a polygon that the user wants to refer to, without performing a troublesome operation, and the collected information can be displayed in an easily understandable manner. Moreover, by specifying a type or a genre of facilities that the user wants to collect information on, it becomes possible for the user to easily find facilities that he/she desires on the map.

The polygons that the present invention uses as a target are various types of polygon shapes such as a mountain, river, ocean, lake, city, ward, town, village, building, park, amusement park, parking lot, tourist site and shopping mall, and various information related to them can be collected.

Furthermore, in the case of building or facility polygons, the map can be scrolled along the building polygon shape, for example, and parking lots around the building can be also searched. Further, in the case of a parking lot polygon, the map can be scrolled along the parking lot polygon shape, and an entrance, exit, restaurant or the like can be also searched.

Further, when a destination is set at a tourist site, the map is scrolled along the tourist site, and searching of a famous facility or searching of traffic congestion, for example, can be also done. As described, by creating a "tourist site" as an area that does not actually exist as geographical data as a pseudo polygon and storing it in the map database such as a CD-ROM, it becomes possible to search around the area and collect information.

Still further, when a large polygon such as an administrative district is selected, its display screen can be formed into a two-screen mode. For example, one of the two screens is used as a wide area screen, on which the entire shape of the selected polygon is displayed, and the region of the map which is being displayed on the screen can be easily recognized.

The map moving method and the map moving apparatus according to the present invention can be used particularly effectively when the user cannot perform many operations such as in the case of a navigation apparatus for a vehicle. In addition, the invention can be also used for map movement on various portable navigation apparatuses such as a PDA, and furthermore, can be used effectively in displaying a map on a personal computer or the like.

While there has been illustrated and described what is at present contemplated to be preferred embodiments of the present invention, it will be understood by those skilled in the art that various changes and modifications may be made, and equivalents may be substituted for elements thereof without departing from the true scope of the invention. In addition, many modifications may be made to adapt a particular situation to the teachings of the invention without departing from the central scope thereof. Therefore, it is intended that this invention not be limited to the particular embodiments disclosed, but that the invention will include all embodiments falling within the scope of the appended claims.

What is claimed is:

1. A map moving apparatus that automatically moves a map screen display region along a map feature displayed on a monitor, comprising:
   a monitor that displays in a map screen display region a map image based on stored map data, the map image including polygon figures defined by polygon data;
   an external instruction input section that is configured to receive a shape input from a user in the map screen display region of the monitor;
   an input shape recognizing section that is configured to recognize a shape that a user inputs to the map screen display region;
   a polygon shape identifying section, that is configured to identify a polygon figure displayed in the map screen display region that approximates said input shape by comparing polygon figures, which are displayed on the map screen, with said input shape; and
   a map movement processing section that is configured to move the map screen display region along said identified polygon figure.

2. The map moving apparatus according to claim 1, further comprising:
   a polygon type identifying section for identifying whether said polygon figure is a linear polygon having an end portion or a ring polygon not having an end portion; and
   a movement mode selecting section that moves the map screen display region in an opposite direction when the map screen display region reaches said end portion if said polygon type identifying section identifies the polygon figure as a linear polygon.

3. The map moving apparatus according to claim 1, further comprising:
   a polygon type identifying section for identifying whether said polygon figure is a linear polygon having an end portion or a ring polygon not having an end portion; and
   a movement mode selecting section that stops the movement of the map screen display region when the map screen display region reaches said end portion if said polygon type identifying section identifies the polygon figure as a linear polygon.

4. The map moving apparatus according to claim 1, further comprising:
   a polygon type identifying section identifying whether said identified polygon figure is a linear polygon having an end portion or a ring polygon not having an end portion; and
   a movement mode selecting section that moves the map screen display region in a circulating manner along said ring polygon if said polygon type identifying section identifies the identified polygon figure as a ring polygon having no end portion.

5. The map moving apparatus according to claim 1, further comprising:
   a polygon type identifying section for identifying whether the identified polygon figure is a linear polygon having an end portion or a ring polygon not having an end portion; and
   a movement mode selecting section, that stops map movement after the map screen display region moves completely around the ring polygon if said polygon type identifying section identifies the identified polygon figure as a ring polygon having no end portion.

6. The map moving apparatus according to claim 1, further comprising:
   an input speed detecting section that detects a speed at which the user inputs a shape to the map screen display region; and
   a moving speed setting section that sets a speed at which the map screen display region is moved according to the speed at which said shape was input.

7. The map moving apparatus according to claim 1, further comprising:
   an input direction detecting section that detects a direction in which the user inputs a shape to the map screen display region; and
   a moving direction setting section that sets a direction in which the map screen display region is moved to be the same as the direction in which said shape was input.

8. The map moving apparatus according to claim 1, further comprising:
   a map movement processing section that moves the map screen display region such that the center of the map screen display region corresponds to a part of said identified polygon figure when said polygon identifying section identifies a polygon figure approximating the input shape.

9. The map moving apparatus according to claim 1, further comprising:
   a polygon identifying section that selects the most approximate polygon figure when said polygon identifying section detects that a plurality of polygon figures, whose shapes approximate a shape recognized by said polygon shape recognizing section, exist.

10. The map moving apparatus according to claim 1, further comprising:
a guidance information output section that provides guidance information to the user on a screen or by voice when guidance information exists in said moving map screen display region.

11. The map moving apparatus according to claim 10, further comprising:
a moving speed setting section that reduces the map moving speed when said guidance information exists.

12. The map moving apparatus according to claim 10, further comprising:
a map/information input section that obtains said guidance information by external communication.

13. The map moving apparatus according to claim 10, wherein said apparatus accumulates and provides said guidance information according to the movement of the map.

14. The map moving apparatus according to claim 10, further comprising:
a guidance information selecting section that selects and provides guidance information of a previously set type.

15. The map moving apparatus according to claim 10, further comprising:
a guidance information output section that identifies nearby parking lots when the identified polygon figure is a building and the map screen display region is moved along the building.

16. The map moving apparatus according to claim 10, wherein when the identified polygon figure is a parking lot and the map screen display region is moved along the parking lot, the apparatus identifies at least one of an entrance, an exit and a restaurant.

17. The map moving apparatus according to claim 1, wherein said map moving apparatus is incorporated in a navigation apparatus for a vehicle.

18. The map moving apparatus according to claim 1, wherein by storing a pseudo polygon indicating a site in a map database, the map is moved along the pseudo polygon when a destination included therein is set in said navigation apparatus.

* * * * *